United States Patent [19]
Elliott et al.

[11] Patent Number: 6,152,975
[45] Date of Patent: *Nov. 28, 2000

[54] METHOD FOR AQUEOUS PHASE REACTIONS

[75] Inventors: Douglas C. Elliott, Richland; Todd R. Hart, Kennewick, both of Wash.

[73] Assignee: Battelle Memorial Institute, Richland, Wash.

[*] Notice: This patent is subject to a terminal disclaimer.

[21] Appl. No.: 09/255,296

[22] Filed: Feb. 22, 1999

Related U.S. Application Data

[62] Division of application No. 08/780,094, Dec. 19, 1996, Pat. No. 5,977,013.

[51] Int. Cl.[7] ............................................. C10J 3/00
[52] U.S. Cl. ................ 48/197 R; 585/240; 585/241; 502/304; 502/335
[58] Field of Search ................... 48/197 R, 209, 48/248; 585/240, 241; 502/304, 335

[56] References Cited

U.S. PATENT DOCUMENTS

| | | | |
|---|---|---|---|
| 2,911,357 | 11/1959 | Myers et al. | 208/138 |
| 3,243,387 | 3/1966 | Blume et al. | 252/466 |
| 3,410,661 | 11/1968 | Taylor | 23/213 |
| 3,617,518 | 11/1971 | Sinfelt et al. | 208/138 |
| 3,823,088 | 7/1974 | Box, Jr. et al. | 210/63 |
| 5,616,154 | 4/1997 | Elliott et al. | 48/197 R |
| 5,630,854 | 5/1997 | Sealock et al. | 48/127.7 |
| 5,814,112 | 9/1998 | Elliott et al. | 48/197 R |
| 5,997,701 | 11/1999 | Elliott et al. | 502/337 |

*Primary Examiner*—Hien Tran
*Assistant Examiner*—Basia Ridley
*Attorney, Agent, or Firm*—Stephen R. May

[57] ABSTRACT

A method for converting liquid organic material in a mixture into a product utilizing a catalyst in the form of a plurality of porous particles wherein each particle is a support having nickel metal catalytic phase or reduced nickel deposited thereon in a first dispersed phase and an additional metal deposited onto the support in a second dispersed phase. The additional metal is effective in retarding or reducing agglomeration or sintering of the nickel metal catalytic phase without substantially affecting the catalytic activity, thereby increasing the life time of the catalyst.

18 Claims, 2 Drawing Sheets

METHOD FOR AQUEOUS PHASE REACTIONS

CROSS REFERENCE TO RELATED APPLICATION

This patent application is a divisional application of Ser. No. 08/780,094, filed Dec. 19, 1996, now U.S. Pat. No. 5,977,013.

This invention was made with Government support under Contract DE-AC06 76RLO 1830 awarded by the U.S. Department of Energy. The Government has certain rights in the invention.

FIELD OF THE INVENTION

The present invention relates generally to a catalyst useful for aqueous phase reactions; more specifically, a dispersed nickel catalyst on a support with an added metal which is useful to retard or prevent agglomeration of the nickel during catalyzed aqueous phase reactions.

BACKGROUND OF THE INVENTION

Use of nickel catalysts and copper/nickel catalysts is well known for use in catalyzing gas-phase chemical reactions (non-aqueous phase chemical reactions) as seen in U.S. Pat. No. 4,251,394 to Carter et al. Carter et al. teach a co-precipitation of nickel together with the copper and silicate ions resulting in a catalyst containing an amount of nickel from about 25 wt % to about 50 wt % and an amount of copper from about 2 wt % to about 10 wt %. The nickel within the nickel/copper/silicate catalyst begins reduction in the presence of hyrdogen at about 200° C. lower than a nickel/silicate catalyst. They further demonstrate that the improved reduction of the nickel is not observed when the copper is simply added to a nickel/silicate catalyst surface. Under non-aqueous conditions (benzene in cyclohexane), they demonstrated that the nickel/copper/silicate catalyst had greater activity than the nickel/silicate catalyst.

The use of a nickel/copper/chromia catalyst in the presence of water, ammonia and aqueous ammoniacal solutions is discussed in U.S. Pat. No. 3,152,998 to Moss. Moss describes the necessity of a high fraction of reduced nickel (at least about 30% of the nickel) in order for the catalyst to be resistant to attrition in an aqueous ammoniacal solution. The catalyst is made from soluble salts, for example nitrates, of nickel, copper and chromium that are co-precipitated resulting in a catalyst composition of 60–85% nickel, 14–37% copper and 1–5% chromium. The catalysts are used to produce heterocyclic nitrogen compounds including piperazine and carbon-substituted alkyl derivatives, cycloalophatic amines from cycloalkanols and morpnoline and carbon-substituted alkyl derivatives. For reactions at temperatures from 150° C. to 400° C., the catalyst particles are demonstrated to remain whole for about 18 to 23 days.

Another patent, U.S. Pat. No. 4,146,741 to Prichard, also discusses catalyzed reactions in an aqueous phase. Prichard converts furan to 1,4-butanediol and tetrahydrofuran in a dicarboxylic acid and water in the presence of a catalyst of nickel/copper/chromium on a support. The thrust of this patent is the use of dicarboxylic acids and a non pyrophoric nickel catalyst. The amount of nickel may range from 1 to 60 wt %. The added copper (2 to 35 wt %) is shown to improve the yield of diol product. No comment is made with respect to catalyst integrity with or without one of the metal constituents. Prichard does not specify a useful support but indicates that any of several conventional support materials can be used.

Sinfelt, Journal of Catalysis, shows nickel copper alloy catalyst and states

... alloying of copper with nickel leads to catalytic effects in hydrogenolysis which are dramatically different from those observed for hydrogenation, dehydrogenation reactions . . . .

Thus, it is clear from Sinfelt that alloying of copper with nickel leads to increased catalytic activity compared to use of nickel alone. Surface areas of catalysts range from 0.63 $m^2/g$ for 5% copper in nickel alloy 1.46 $m^2/g$ for 95% copper in nickel alloy. Although Sinfelt reports low surface area catalysts in his paper, U.S. Pat. No. 3,617,518 describes a copper nickel alloy dispersed on supported catalyst providing a higher surface area.

More recent work by Elliott et al. (Ind. Eng. Chem. Res. Vol. 32, No. 8, pp. 1542–8, 1993) has focused upon aqueous phase reactions at 350° C., wherein it was discovered that the commercially available catalysts (nickel-only) interacted with the water in the aqueous phase resulting in agglomeration or sintering of the catalytic metal (nickel-only) dispersed upon the support thereby reducing the activity and effective life time of the catalysts. The commercially available catalysts tested was a range of commercially produced supported nickel metal catalysts used for hydrogenation, steam reforming, and methanation reactions. In addition, Elliott et al. found that commercially available silica, alumina, and silica-alumina catalyst supports were not stable in an aqueous processing environment. Because Prichard operated a batch process making no time based observations of his catalyst, and because his process was limited to about 7 or 8 hours, he would not have observed any degradation of catalyst and therefore would have no motivation to solve the problem of limited catalyst life in aqueous media at elevated temperatures required for a continuous process. The problem of support stability is avoided by Moss by the use of an alloy catalyst with a small amount of chromia binder.

It has been reported by R Srinivasan, R J DeAngelis, B H Davis Catalysis Letters, 4 (1990) 303–8 that improved activity of Sn/Pt catalysts for hydrocarbon reforming in a gas phase reaction might be explained by Sn stabilization of Pt crystallites formed on alumina. However, ratios of 3 to 4 of Sn to Pt were required for maximum effect, but alloy formation is not believed to be the cause.

Further, K Balakrishnan and J Schwank, Jour. of Catalysis, 132 (1991) 451–464 report that Sn addition reduces the activity for Pt catalyzed hydrocarbon reforming in the gas phase at 300° C. while improving the activity maintenance. In contrast, Au (gold) addition improved the activity but made no significant difference in the rate of deactivation.

However, until Elliott et al., the problem of nickel agglomeration for aqueous phase reactions at these temperatures was not observed. Accordingly, there is a need for a catalyst that avoids agglomeration in aqueous phase reactions.

SUMMARY OF THE INVENTION

The present invention is a catalyst in the form of a plurality of porous particles wherein each particle is a support having nickel metal catalytic phase or reduced nickel deposited thereon as a dispersed phase and an additional metal deposited onto the support as an additional dispersed phase. The additional metal is effective in retarding or reducing agglomeration or sintering of the nickel metal catalytic phase thereby increasing the effective life time of the catalyst. The present invention is useful in any aqueous phase reaction, especially non-oxidizing reactions.

It is an object of the present invention to provide a reduced nickel catalyst that resists agglomeration or sintering in aqueous phase processing.

It is a further object of the present invention to provide a long lived catalyst at a reduced cost.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 1 is pictorial and does not explicitly show all of the pores and/or droplets present on an actual catalyst particle.

DESCRIPTION OF THE PREFERRED EMBODIMENT(S)

Figure 1:
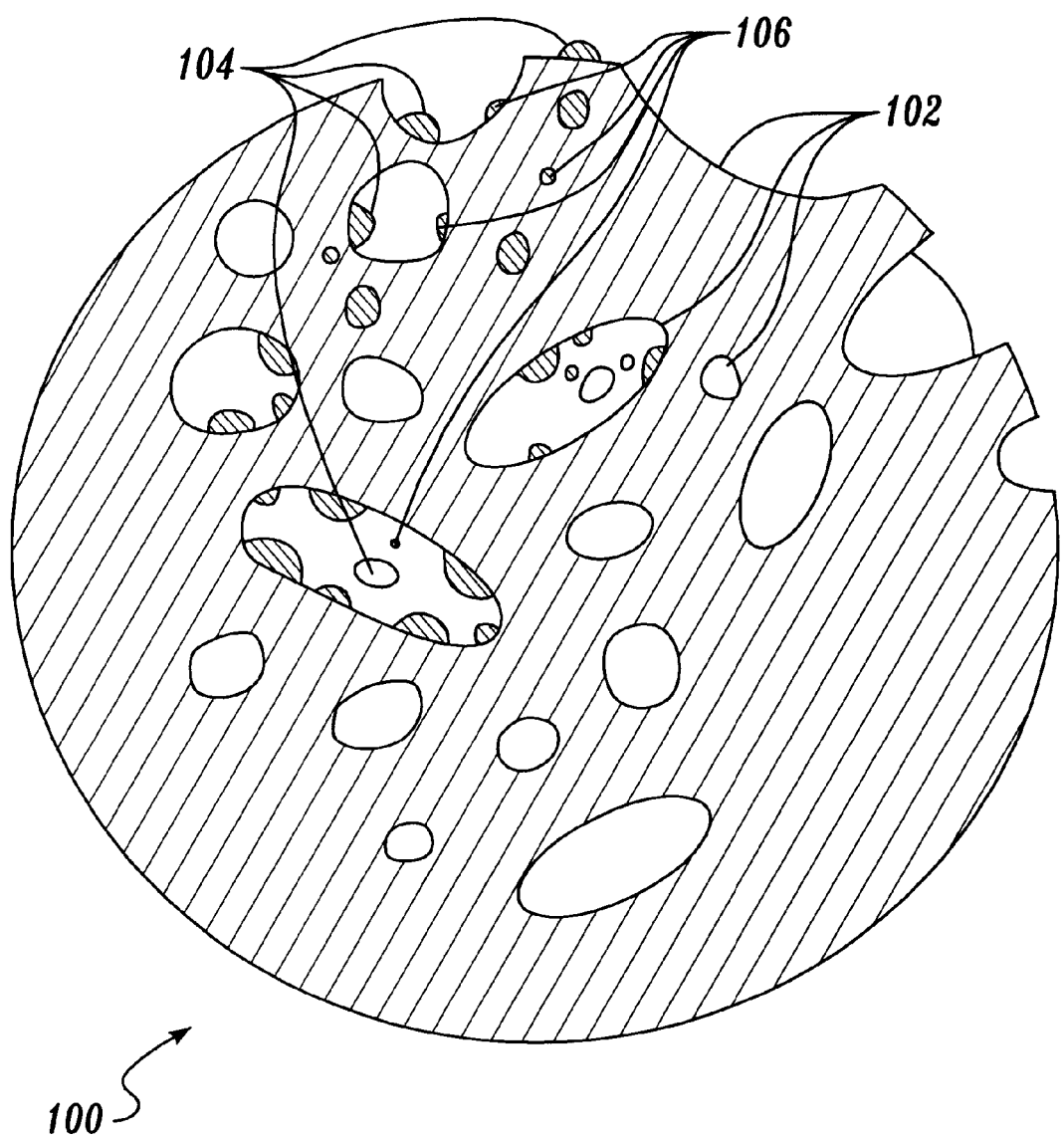
FIG. 1 is an enlarged cross section view of a catalyst particle according to the present invention.

The present invention is a catalyst for a catalyzed aqueous phase reaction that is in the form of a plurality of particles wherein each particle has a porous support and an amount of a dispersed catalyst phase deposited upon the porous support. Aqueous phase reactions are preferably non-oxidizing reactions including but not limited to steam reforming and hydrogenation reactions. It was discovered that an additional metal deposited as an additional dispersed phase upon the porous support is effective in resisting agglomeration or sintering of the nickel metal catalyst phase, thereby increasing the useful life time of the catalyst. As depicted in FIG. 1, a particle 100 of a porous support has pores 102. The dispersed catalyst phase is a plurality of solid droplets 104 of a reduced nickel metal. The added metal is a second plurality of solid droplets 106 of an agglomeration retarding metal. Both the dispersed catalyst solid droplets 104 and the agglomeration retarding metal solid droplets 106 adhere to surfaces of the particle 100 or surfaces of the pores 102.

According to the present invention the nickel in the dispersed phase 104 may have impurities or be doped or alloyed with a material that may either be effective or ineffective in increasing catalytic activity. Further it is contemplated that the additional metal 106 may be an alloy or dispersed combination of metals. For example, the dispersed reduced nickel phase may be a reduced nickel/copper catalytic alloy having substantially more reduced nickel than copper and the additional metal dispersed phase for agglomeration resistance may be a second alloy of nickel or reduced nickel and copper having substantially more copper than nickel. Alternatively, the added metal may simply be a non-alloyed copper. However, it has been found that added metals tested did not change the catalytic activity compared the reduced nickel metal phase in the absence of the added metal(s).

The amount of reduced nickel in the catalytic dispersed phase is preferably at least about 20 wt %, and more preferably about 50 wt %.

In a preferred embodiment, the additional metal is a separate and distinct phase from the dispersed nickel phase and prevents or retards agglomeration of the nickel phase between catalyst particles. It is further preferred that the amount of added metal is preferably less than or equal to about 5 wt %, more preferably less than 2 wt %, and most preferably from about 0.1 wt % to about 1 wt %. The added metal is selected from the group of copper, silver, rhenium, tin, ruthenium and combinations thereof. Copper, silver, rhenium and tin are preferred because they do not substantially affect the activity of the nickel catalyst. Ruthenium affects the catalyst activity. Tin and rhenium were shown to be less effective than copper and/or silver in increasing catalyst life time, and lead was found to be ineffective.

The porous support may be any porous support including but not limited to titania in the rutile form, zirconia in the monoclinic form, high-surface area granulated carbons, or boehmite. A preferred support is one that is stable in aqueous phase chemical reaction conditions. Stable means physically intact and chemically inert and does not come apart or disintegrate under aqueous phase reaction conditions.

The method for making the catalyst of the present invention has the steps of forming a porous support with an amount of a reduced nickel metal catalyst dispersed phase deposited upon the porous support providing a catalyst activity, followed by depositing an additional metal upon the porous support as an additional dispersed phase in an amount that is effective in resisting agglomeration or sintering of the reduced nickel metal catalyst phase.

It is preferred that the deposition of the additional metal is separate and distinct from forming the porous support with an amount of reduced nickel metal catalyst dispersed phase. Specifically, the reduced nickel metal catalyst phase may be applied to a support or the reduced nickel metal catalyst phase and support may be co-precipitated. However, the additional metal deposition occurs separately from the formation of the supported reduced nickel metal catalyst phase and may be accomplished by impregnation of the porous support with soluble salts of the additional metal followed by reduction of the salt to the metal form. Salt solution is wetted onto the surface of the catalyst and goes into the pores of the catalyst, then dried.

The catalysts are useful in aqueous phase reactions including hydrogenation and steam reforming reactions. The hydrogenations are generally carried out catalytically in water at a temperature from about 150° C. to about 350° C. with a hydrogen overpressure. Hydrogenation can include saturation of multiple bonds, reduction of oxygen functional groups, such as ketones, aldehydes, lactones and carboxylic acids; hydrogenolysis, such as reduction of alcohols and phenolics, scission of ether linkages and all similar reactions of organically bound nitrogen; hydrocracking of hydrocarbon structures; or methane synthesis. More specifically, hydrogenation reactions include but are not limited to sorbitol conversion to ethylene glycol, propylene glycol, and glycerol; levulinic acid conversion to gamma valerolactone; 1,4-pentanediol and methyl tetrahydrofuran, xylitol conversion to ethylene glycol and glycerol; succinic acid conversion to gamma butyrolactone, 1,4-butanediol and tetrahydrofuran.

The present invention further includes a steam reforming reaction. The steam reforming reaction converts organic material into a gas, having the steps of:

providing a liquid reactant mixture containing liquid water and liquid organic material within a pressure reactor;

adding a catalyst in the form of a plurality of particles, each particle formed of a porous support with an amount of a reduced nickel metal catalyst phase deposited upon the porous support in a first dispersed phase providing a catalyst activity, further having an added metal upon the porous support as a second dispersed phase in an amount that is effective in resisting agglomeration or sintering of the nickel metal catalyst phase, wherein the second dispersed phase is separate and distinct from said the dispersed phase, and maintaining the liquid reactant mixture at temperature and pressure conditions from about 300° C. to about 450° C. and at least 130 atmospheres effective to maintain said liquid reactant mixture substantially as liquid for a time, wherein an amount of the catalyst and the time being sufficient for the converting the organic material into the gas composed primarily of methane, carbon dioxide, and hydrogen. The reactant mixture may contain organic materials that are solid(s) at ambient or non-process conditions but which become liquid at the process conditions from about 300° C. to about 450° C. and at least 130 atmospheres. The added metal is selected from ruthenium, copper, silver, rhenium, tin and combinations thereof. This particular process using a reduced metal catalyst of ruthenium, rhodium, osmium, iridium and combinations thereof is further described in co-pending application Ser. No. 08/227,892 filed Apr. 15, 1994 hereby incorporated by reference. The reduced metal catalyst may be combined with reduced nickel in this process.

EXAMPLE 1

An experiment was conducted to identify added metals that would be effective in preventing agglomeration or sintering of the reduced nickel catalyst. All catalysts used in this experiment contained 50 wt % reduced nickel dispersed on a support (G1-80 BASF, Geismar, La.). The added metal was in an amount of 1 wt % or 5 wt % dispersed on the support. Added metals in this experiment are shown in Table 1.

TABLE 1

| ADDED METALS |
| --- |
| Ruthenium |
| Copper |
| Rhenium |
| Tin |
| Lead |
| Silver |

Each of these catalysts was added to a mixture of phenol and water with the amount of phenol of about 10 vol %, 240,000 ppm COD. The amount of catalyst compared to mixture was about 1:6. The catalyzed mixture was placed in a reactor vessel and heated to 350° C. to achieve gasification of the phenol. This gasification includes steam reforming reactions and hydrogenation reactions within the reaction vessel. Product gas samples were withdrawn through a sample port every 15–25 minutes over 2 hours. After the test was completed, used catalyst was recovered from the reactor and examined with X-Ray Diffraction analysis.

The used catalysts were further placed in water without any phenol and with a hydrogen cover gas in a reaction vessel. The reaction vessel was heated to and held at 350° C. for 60 to 65 hours to age the catalyst. Additional X-Ray Diffraction analysis was performed on the aged catalyst.

Long term tests up to 24 weeks were performed with the catalytic mixtures. Temperatures were maintained at about 350° C.

Results for the gasification are shown in Table 2.

TABLE 2

Nickel Catalyst Batch Test Results as a Function of Added Metal

| Added Metal | Time (min) | Product Gas Composition (vol %) | | | | | Residual COD, ppm | Gasification of carbon, % |
| --- | --- | --- | --- | --- | --- | --- | --- | --- |
| | | $CH_4$ | $CO_2$ | $H_2$ | $C_2$ | BF | | |
| None | 120 | 55.2 | 40.3 | 3.3 | 0.5 | 0.6 | 1320 | 87.6 |
| 0.1% Ru | 125 | 53.7 | 43.5 | 1.7 | 0.5 | 0.6 | 1600 | 96.2 |
| 5% Ru | 115 | 59.7 | 36.5 | 3.0 | 0.5 | 0.4 | 1140 | 89.8 |
| 1% Cu | 120 | 57.2 | 37.6 | 4.2 | 0.4 | 0.5 | 6000 | 80.5 |
| 1% Re | 100 | 55.6 | 41.7 | 0.6 | 0.4 | 1.6 | 1370 | 87.8 |
| 1% Sn | 125 | 58.1 | 37.2 | 3.0 | 0.4 | 1.3 | 1270 | 61.9 |
| 1% Pb | 120 | 49.4 | 38.3 | 10.3 | 0.5 | 1.3 | 115,000 | 32.6 |

BF = backflush from chromatography columns, assumed to be higher hydrocarbons.
In all cases the reaction appeared to be complete before the end time of the test.

Nickel catalyst is very active for Low-Temperature Catalytic Gasification. Addition of ruthenium, even at 0.1%, increased catalytic activity. Other added metals, expected to remain reduced at gasification conditions, showed substantially no increased activity for the gasification reaction nor did they interfere with the nickel catalyst activity. Only the lead seemed to be a problem because it converted to a carbonate rather than remain as a metal. A test with silver ended prematurely when the over-pressure protection rupture disk failed at lower than expected and typical operating pressure. Nevertheless, we observed that silver did not affect the catalytic activity of the nickel. The low gasification measurement in the tin test is believed to be caused by a reactor leak and incomplete gas recovery, since the COD reduction was typical (>99%) and the gas composition showed good catalytic activity.

Results of crystallite size measurements for the aged catalysts are shown in Table 3. Surprising reduction in agglomeration up to a factor of 4 in terms of crystallite size was accomplished with the added metal.

TABLE 3

Catalyst Crystallite Size

| Added Metal | Initial Crystallite Size (nm) | Aged Crystallite Size (nm) |
| --- | --- | --- |
| None | 6 | 40 |
| Ruthenium (5%) | 4.5 | 19 |
| Copper | 6 | 10 |
| Rhenium | 6 | 15 |
| Tin | 6 | 16 |
| Lead | 6 | NA |
| Silver | 6 | 13 |

Long term test results are shown in Table 4, the nickel-only catalyst retained activity for up to four weeks of operation. The nickel metal exhibited the same crystallite growth seen in other nickel-only dispersed metal catalysts as reported in Elliott et al. (See Background) except that after an initial period of growth (up to 40 hours) the crystallites stabilized at 40 nm, up from <5 nm. This compared with growth to >70 nm or 100 nm in the same time period or less with the nickel-only dispersed metal catalysts.

TABLE 4

Long Term Results for Nickel-only and Stabilized Nickel Catalysts

| | 3 weeks | | 4 weeks | | 6 weeks | | 9 weeks | | 24 weeks | |
|---|---|---|---|---|---|---|---|---|---|---|
| catalyst | conv[A] | LHSV[B] | con | LHSV | con | LHSV | con | LHSV | con | LHSV |
| Ni-only | 95.1 | 1.55 | 93.6 | 1.41 | — | — | — | — | — | — |
| 0.1% Ru | — | — | 93.1 | 2.3 | 94.4 | 2.05 | 93.7 | 1.75 | — | — |
| 1% Ru | 99.99 | 1.9 | — | — | 99.8 | 1.9 | 99.8 | 1.8 | 99.0 | 1.7 |
| 5% Ru | 99.9 | 1.97 | 99.8 | 2.2 | — | — | — | — | — | — |
| 1% Ag | 99.8 | 1.66 | 99.8 | 1.66 | — | — | — | — | — | — |
| 1% Cu | 98.0 | 1.67 | 96.6 | 1.68 | 98.7 | 1.68 | 99.2 | 1.66 | — | — |
| 1% Re | 99.8 | 1.69 | | | plugged after <5 days on stream | | | | | |

[A]conv = reduction of chemical oxygen demand
[B]LHSV = Liquid Hourly Space Velocity (vol. of solution)/(volume of catalyst bed)/hour Ruthenium was added to the nickel catalyst at 0.01 wt %, 1 wt % and 5 wt %. The 5 wt % loading produced a very active and longer lived catalyst. After four weeks of operation the catalyst was still very active while maintaining a respectable space velocity, as shown in Table 4. Analysis of the catalyst showed that the nickel crystallites had grown only to 26 nm, thus confirming the hypothesis of the test.

The 1 wt % loading would make the catalyst less expensive. In addition, it was also found to be very active in low-temperature catalytic gasification. As shown in Table 4, a long term test verified high activity for at least 6 months. The nickel crystallite size after 8 months was still <30.0 nm.

The 0.1% ruthenium loading was found to be significantly less active than the other Ru-doped nickel catalyst while still somewhat more active than the undoped catalyst. It exhibited significant loss of activity during the second month of operation, as shown in Table 4. The nickel crystallite size after 63 days (2 months) was 31.0 nm.

The ruthenium appeared to have a significant effect in preventing agglomeration of the nickel phase and in increasing catalyst activity.

A long-term test of the silver-doped nickel catalyst ran for 32 days before a pressure differential across the catalyst bed ended the test. Throughout the test the catalyst activity remained high. Following the test the nickel crystallite size had increased to only 21.4 nm, a surprising improvement over the ruthenium-doped catalyst. The silver metal crystallites were also measurable at 24.2 nm.

The copper appeared to perform better than either the ruthenium or silver in terms of limited crystallite growth. Of course, copper is a less expensive additive and more readily available than silver. The long-term test of the copper-doped nickel catalyst demonstrated good activity through nearly 9 weeks, as shown in Table 4. The nickel crystallite size was measured at only 18.1 nm, an improvement over either silver or ruthenium.

The rhenium showed good activity and was still improving when the experimental reactor plugged after <5 days on line. The used catalyst had nickel crystallites of 14.2 nm, about the same as with ruthenium doping.

Figure 2:
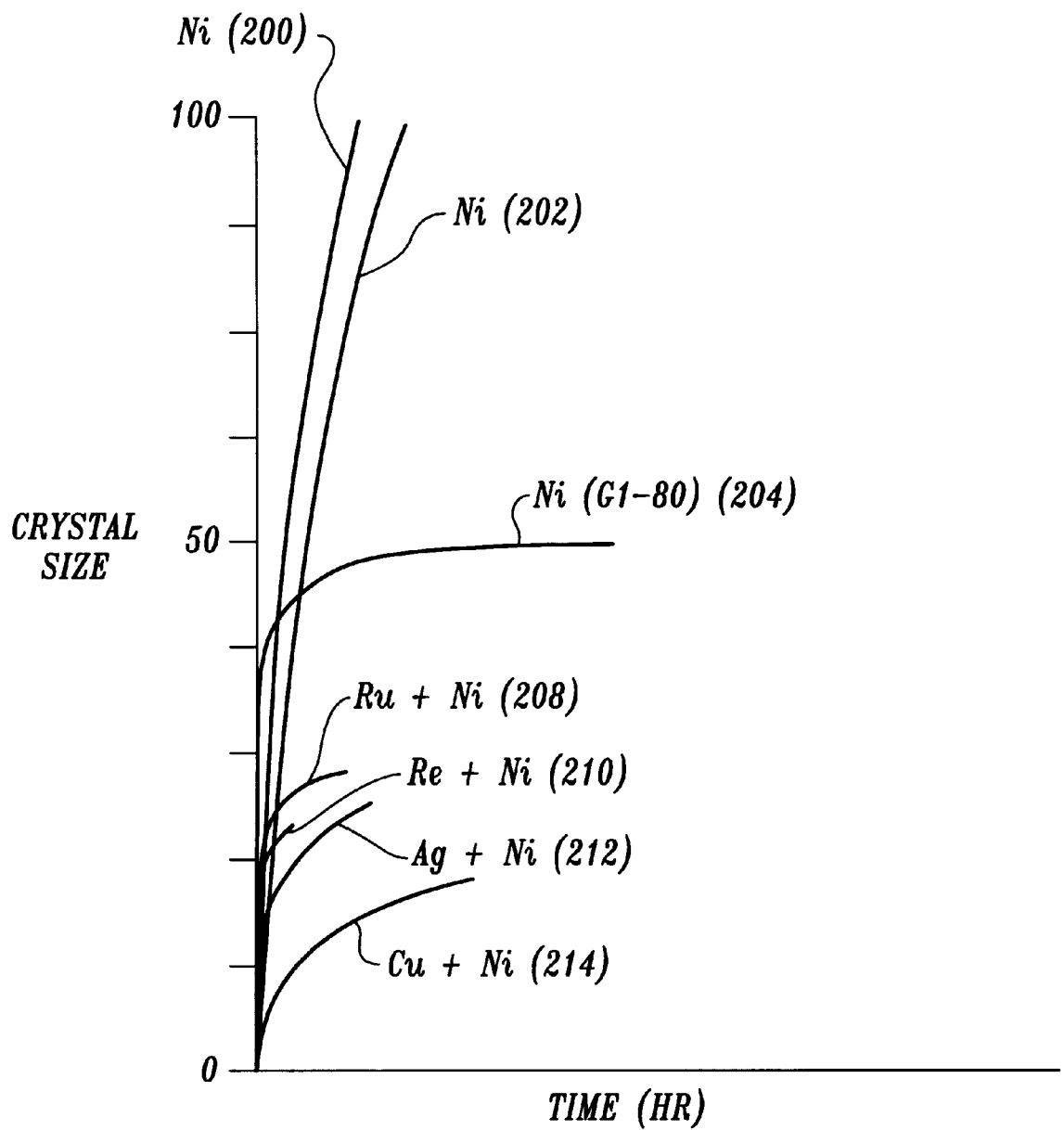
FIG. 2 is graph of crystal size versus time for reduced nickel (nickel) catalysts and for reduced nickel plus added metal dispersed phase catalysts.

The relationship of crystallite size with time on stream in catalytic gasification is shown in FIG. 2 for all the added metal combinations tested herein. FIG. 2 shows crystallite size for nickel-only catalysts (200, 202, 204) and for added metal catalysts (208, 210, 212, 214). The added metal catalysts (208, 210, 212, 214) exhibit greater stability (less increase or growth of crystal size) compared to the nickel-only catalysts (200, 202, 204).

EXAMPLE 2

An experiment was conducted to determine activity of the added metals copper, silver, rhenium, and tin. Each metal, as a dispersed phase, was put onto a titania support and introduced into the gasification reaction conditions from Example 1.

Results are shown in Table 5.

TABLE 5

SUMMARY OF BATCH TEST RESULTS
350° C., 10% phenolic in water
Product Gas Composition

| Catalyst | Gasification, % | $CH_4$ | $CO_2$ | $H_2$ | Time (min) |
|---|---|---|---|---|---|
| 33% Cu/ZnO (reduced) | 0.56 | 2.74 | 33.8 | 52.7 | 80 |
| 6% Cu/SiO$_2$ (reduced) | 0.02 | 0.0 | 1.7 | 98.2 | 90 |
| 3% Sn/TiO$_2$ (reduced) | 0.05 | 0.6 | 3.5 | 95.2 | 125 |
| 3% Ag/TiO$_2$ (reduced) | 0.03 | 0.0 | 8.4 | 91.6 | 120 |
| 3% Re/TiO$_2$ (reduced) | 0.02 | 0.0 | 3.0 | 97.5 | 120 |
| 3% Pb/TiO$_2$ (reduced) | 0.01 | 0.0 | 1.8 | 97.8 | 120 |

Catalyst

The results in Table 5 show that the metals tested (Cu, Sn, Ag, Re, Pb) were not active catalysts for gasification. Almost no gas was produced, and little or no methane was generated. These results contrast dramatically with the high levels of gasification and methane production achieved with nickel and ruthenium catalysts.

Closure

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method for converting organic material into a product, comprising the steps of;

providing a liquid reactant mixture containing liquid water and organic material within a pressure reactor;

adding a catalyst in the form of a plurality of particles, each particle formed of a porous support with an amount of a reduced nickel metal catalyst phase deposited upon the porous support in a first dispersed phase providing a catalyst activity, further having an added metal upon the porous support as a second dispersed phase in an amount that is effective in resisting agglomeration or sintering of the nickel metal catalyst phase and, wherein said second dispersed phase is separate and distinct from said first dispersed phase, and maintaining said liquid reactant mixture at a temperature from at least about 150° C. and a pressure effective to maintain said liquid reactant mixture substantially liquid for a time, wherein an amount of said catalyst and the time being sufficient for the converting the organic material into said product.

2. The method as recited in claim 1, wherein said added metal is selected from the group consisting of copper, silver, rhenium, tin and combinations thereof.

3. The method as recited in claim 2, wherein said temperature is from about 300° C. to about 450° C. and at least 130 atmospheres, and the product is a gas composed primarily of methane, carbon dioxide, and hydrogen.

4. The method as recited in claim 4, wherein said converting is a hydrogenation reaction wherein said temperature is from about 150° C. to about 250° C. and said pressure includes a hydrogen overpressure.

5. The method as recited in claim 4, wherein said hydrogenation is selected from the group consisting of saturation of multiple bonds, reduction of oxygen functional groups, hydrogenolysis, scission of ether linkages, similar reactions of organically bound nitrogen, hydrocracking of hydrocarbon structures, methane synthesis, and combinations thereof.

6. The method recited in claim 2, wherein the amount of the added metal is less than of equal to about 5 wt % of the catalyst.

7. The method recited in claim 6, wherein the amount of the added metal is less than 2 wt % of the catalyst.

8. The method recited in claim 7, wherein the amount of the added metal is from about 0.1 wt % to about 1 wt % of the catalyst.

9. The method recited in claim 1, wherein the amount of reduced nickel metal catalyst phase is at least about 20 wt % of the catalyst.

10. The method recited in claim 1, wherein the amount of reduced nickel metal catalyst phase is about 50 wt % of the catalyst.

11. The method recited in claim 1, wherein the amount of reduced nickel metal catalyst phase is co-precipitated with the porous support.

12. The method as recited in claim 1, wherein said reduced nickel metal catalyst phase is an alloy containing said reduced nickel metal in an amount greater than an alloy metal.

13. The method as recited in claim 12, wherein said alloy metal is selected from the group of copper, silver, tin, rhenium, ruthenium and combinations thereof.

14. The method as recited in claim 1, wherein said added metal is an alloy.

15. The method as recited in claim 14, wherein said alloy contains an amount of said added metal greater than an alloy metal.

16. The method as recited in claim 15, wherein said alloy metal is selected from the group consisting of copper, silver, tin, rhenium, and combinations thereof.

17. The method as recited in claim 1, wherein said porous support is stable during the maintaining step, remaining physically intact and chemically inert without coming apart or disintigrating during the maintaining step.

18. The method as recited in claim 17, wherein said porous support is selected from the group consisting of titania in a rutile form, zirconia in a monoclinic form, high-surface area granulated carbons, boehmite, and a commercial support from a G1-80 catalyst.

* * * * *